April 24, 1928.
T. E. SIKES
1,667,442
DENTAL X-RAY FILM HOLDER
Filed April 17, 1926     2 Sheets-Sheet 2
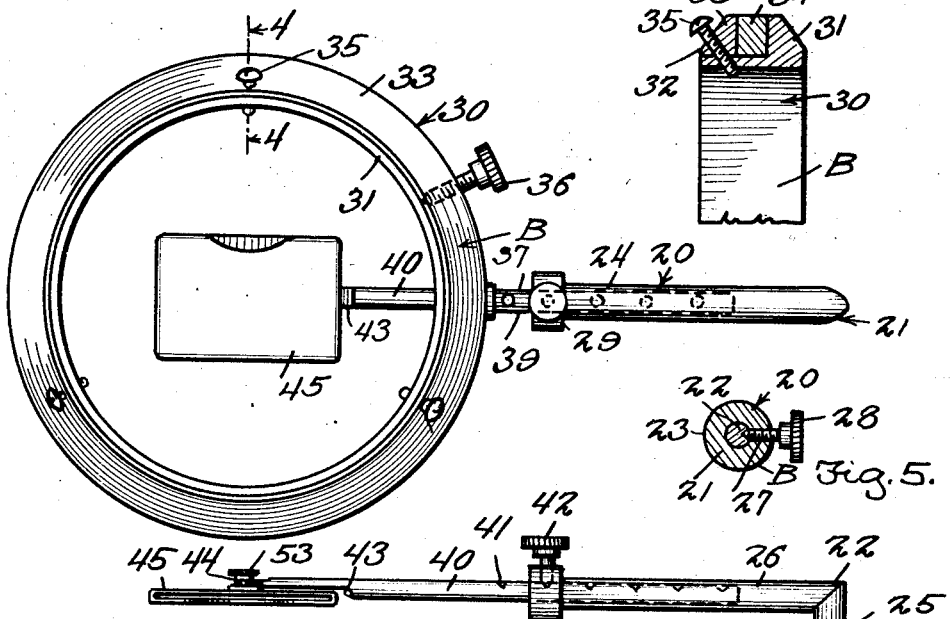
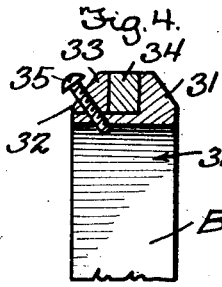
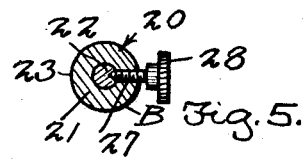
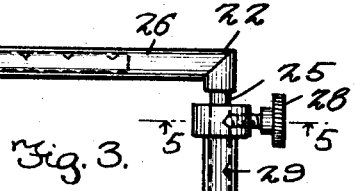
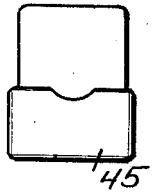
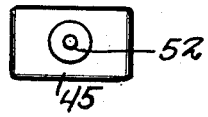
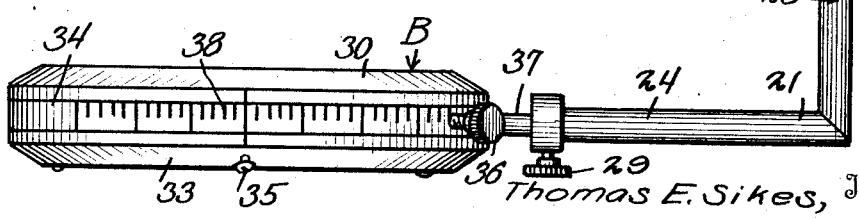
Thomas E. Sikes, Inventor Patented Apr. 24, 1928.

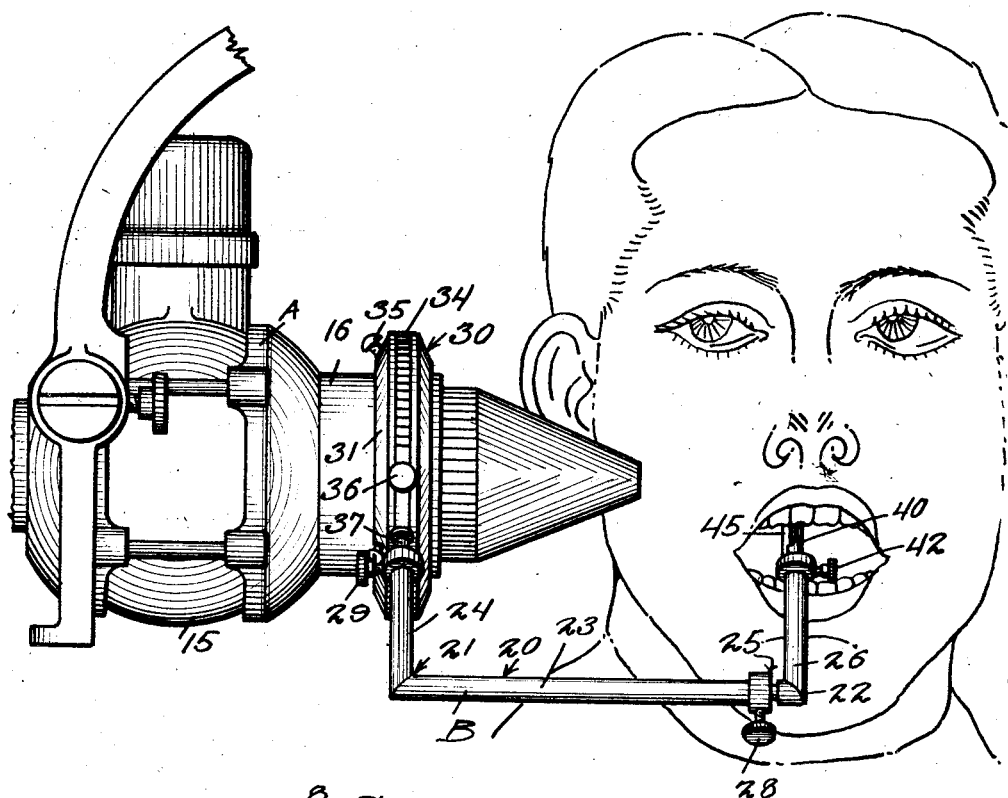

1,667,442

UNITED STATES PATENT OFFICE.

THOMAS E. SIKES, OF GREENSBORO, NORTH CAROLINA.

DENTAL X-RAY FILM HOLDER.

Application filed April 17, 1926. Serial No. 102,751.

This invention appertains to X-ray machines and more particularly to a novel film holder for a dental X-ray machine.

The primary object of the present invention is to provide novel means for supporting a film by a portion of the X-ray machine itself, thereby eliminating the necessity of the film plate being held by the patient or by some other extraneous means.

Another object of the invention is the provision of a novel case or holder for the film itself whereby the film will be held against contact with portions of the mouth, the holder being smooth to the touch and causing no irritation of the tissues of the mouth, and novel means for adjustably connecting the case or film holder with the X-ray machine, the film holder being freely removable from said means to permit the easy sterilization thereof.

A further object of the invention is the provision of a holder or film support for slidably receiving the film plate, the holder positively engaging the film throughout the entire area thereof, thereby holding the film against distortion or flexing movement whereby the difficulties contingent with the flexing of the film is entirely eliminated resulting in a perfect picture of the tooth or teeth being taken and surrounding areas.

A further object of the invention is the provision of novel means for associating the support for the film holder with the X-ray machine whereby the holder can be adjusted relative to the machine and to the patient, the support or holder being also made adjustable to a number of different positions to effectively take care of the position of the film holder in the mouth and the configuration of the mouth or jaw.

A still further object of the invention is to provide an X-ray film holder for dental X-ray machines of the above character, which will be durable and efficient in use, one that will be simple and easy to manufacture and one which can be placed upon the market and incorporated with a conventional X-ray machine at a small cost.

With these and other objects in view, the invention consists in the novel construction, arrangement and formation of parts, as will be hereinafter more specifically described, claimed, and illustrated in the accompanying drawings, in which drawings:

Figure 1 is a side elevation of the improved attachment applied to a conventional X-ray machine showing the same in use, Figure 2 is a front elevation of the attachment, Figure 3 is a top plan view of the same, Figure 4 is a detail section through the retaining collar and adjustable ring on the line 4—4 of Figure 2, Figure 5 is a detail section taken on the line 5—5 of Figure 3 illustrating the means for adjustably connecting the parts of the supporting frame together, Figure 6 is a front elevation of one of the film holders which can be used when X-rays are being taken of the molar teeth, Figure 7 is an end elevation of the holder, Figure 8 is a detail section through the holder taken on the line 8—8 of Figure 6 showing one of the films being slid into the holder, Figure 9 is a front elevation of a smaller size of holder which can be used for the incisors, Figure 10 is a rear elevation of the smaller holder.

Referring to the drawings in detail, wherein similar reference characters designate corresponding parts throughout the several views, the letter A generally indicates an X-ray machine and B the novel attachment therefor.

The X-ray machine A is of the conventional type and will not, therefore, be described in detail, but the same includes the usual tube 15 and the covering or casing 16 therefor.

The improved attachment B comprises essentially a frame 20, an attaching device 30 for connecting the frame to the X-ray machine A and the adjustable arm 40 for the film holder 45.

The frame 20 includes a pair of telescoping L-shaped members 21 and 22 which are preferably made of non-electric conducting material such as hard rubber, fiber or the like. The member 21 includes the relatively long leg 23 and the relatively short right angularly extending leg 24. These legs are of a hollow formation as shown. The member 22 also consists of the right angularly extending legs 25 and 26 and the leg 25 is telescopically mounted in the leg 23. The leg 25 is preferably provided with equidistantly spaced seats 27 into any one of which is adapted to seat an adjustable thumb screw 28 carried by the free end of the arm 23 whereby the members 21 and 22 can be held in an adjusted position relative to one another. The free end of the leg 24 of the member 21 is provided with an adjustable thumb screw 29 for a purpose, which will hereinafter more fully appear.

The holding and attaching means 30 for the frame 20 comprises an annular cuff or collar 31 which is fitted on the front portion of the covering or casing 16 of the tube 15 of the X-ray machine A. This collar or cuff 31 is provided with an annular rabbeted portion 32 on its outer face for the reception of a retaining ring 33 utilized for rotatably holding the collar or supporting ring 34 on the attaching collar or cuff 31. Holding screws 35 extend through the ring 33 and the cuff or collar 31 for impinging against the covering 16 for rigidly holding the collar or cuff 31 in place against accidental movement. As stated the ring 34 is freely rotatable on the attaching collar or cuff 31 and the same can be held in an adjusted position thereon by a thumb screw 36 associated with the ring 34 for engaging the said collar or cuff 31. The ring or collar 34 is provided with a radially extending shank 37 which is adjustably mounted in the hollow leg 24 of the member 21 of the frame 20. If preferred the rotatable ring or collar 34 can be graduated as at 38 so as to facilitate the adjusting of the frame 20 on the machine A. The thumb screw 29 is adapted to impinge against the shank 37 for adjustably holding the frame 20 varying distances radially of the machine A. If preferred the shank 37 can be provided with equidistantly spaced seats 38 for receiving the thumb screw 29.

The adjusting arm 40 for the film holder 45 is slidably mounted within the hollow arm 26 of the member 22 of the frame 20 and is provided with equidistantly spaced seats 41 into any one of which is adapted to fit an adjustable thumb screw 42 carried by the free end of the arm or leg 26 whereby the holder 45 can be adjusted varying distances relative to the frame 20. The outer end of the arm 40 is preferably flattened or reduced in diameter as at 43 for a purpose, which will be hereinafter more fully described and the extreme outer end of the arm is provided with a transversely extending opening 44 for a purpose, which will also hereinafter appear.

In Figures 6 to 10 inclusive I have shown a preferred form of holder for the X-ray film 46 and these holders are adapted to be made in varying sizes so as to facilitate the taking of the X-ray pictures of the different teeth. The holder shown in Figures 6 to 8 inclusive can be considered as the largest type for taking pictures of the molars while the holder shown in Figures 9 and 10 can be of the smallest type for taking pictures of the cuspids or incisors. There can be varying sizes of the holders between the two sizes illustrated.

The holders 45 form one of the salient features of the invention and are preferably made from cast aluminum suitably polished so as not to cause discomfort when placed in the mouth of the patient. Each holder consists of a front and rear wall 47 and 48, a bottom wall 49 and side walls 50. The walls 47 and 48 are arranged parallel to one another so as to preclude all possibility of the flexing of the film or any distortion thereof and these walls engage the entire area of the front and rear faces of the film. As shown the film 46 is introduced into the holder through the upper open end thereof and the upper edge of the front wall 47 can be provided with a notch 51 to facilitate the withdrawal of the film after the picture has been taken. A threaded stud 52 is carried by the center of the rear wall 48 and is rotatably mounted in the opening 44 in the outer end of the adjusting arm 40. A suitable thumb nut 53 is mounted upon the stud for engaging the arm 40 so as to hold the film holder 45 in correct adjusted position on the said arm.

In use of the improved device B, the same is attached to the machine A as heretofore described and the desired size of holder 45 is connected to the outer end of the arm 40 and locked in the desired position according to which tooth is to be X-rayed. The film is now slipped in the holder and the frame 20, the arm 40 and the shank 37 in the frame is adjusted according to the facial characteristics of the patient and the ring is adjusted on the holding collar 31. The film will be held in the correct position in the mouth without distortion and without aid from the patient.

Changes in details may be made without departing from the spirit or scope of this invention, but:

What I claim as new is:

1. The combination with an X-ray machine, of a film holder for receiving and maintaining the film in a flat condition against distortion, a ring rotatably mounted upon the X-ray machine, a substantially U-shaped frame connecting the film holder with the rotatable ring, and means for adjusting the frame to conform to the facial characteristics of the patient on which the machine is used.

2. The combination with an X-ray machine including a tube and a covering for the tube, of a holder for the X-ray film, a supporting cuff secured to the covering for the tube, a ring rotatably mounted upon the cuff, means adjustably holding the ring in place on the cuff, an adjustable U-shaped frame having one arm connected with and adjustable toward and away from the rotatable ring, and means adjustably connecting the other arm of the frame with the film holder.

3. The combination with an X-ray machine including a bulb and a covering therefor, of a film holder including front and rear walls for snugly receiving a film therebetween, a U-shaped frame including a pair of telescopic L-shaped sections, means holding the sections in adjusted position relative to one another, a ring rotatably mounted upon the covering for the tube of the X-ray machine, means holding the ring in adjusted position on the machine, a radially extending shank adjustably connected with one arm of the frame, a movable arm adjustably carried by the other arm of the frame, and means for adjustably connecting the film holder with the movable arm.

In testimony whereof I affix my signature.

THOMAS E. SIKES.